3,378,342
PROCESS FOR PREPARING PHOSPHITES
Robert E. Mesmer, George Douglas Nelson, and John
H. Payne, St. Louis, Mo., assignors to Monsanto Company, St. Louis, Mo., a corporation of Delaware
No Drawing. Filed Dec. 21, 1964, Ser. No. 420,094
13 Claims. (Cl. 23—107)

ABSTRACT OF THE DISCLOSURE

A process is described for preparing dialkali metal phosphites by reacting white phosphorus and alkali metal hydroxide in an aqueous medium at temperatures above about 50° C. with the alkali metal hydroxide being present in amounts in excess of stoichiometry and in concentrations greater than 15% by weight.

---

This invention relates to a process for preparing phosphites and, more particularly, to an improved process for preparing dialkali metal phosphites, especially disodium phosphite.

Dialkali metal phosphites are customarily prepared from orthophosphorous acid made by hydrolyzing phosphorus trichloride. Such a method has many limitations among which include the many manipulative steps required to reach the desired phosphites, that is, the phosphorus trichloride must be first prepared followed by hydrolyzing such to orthophosphorous acid followed by neutralization of the acid to the phosphite, as well as the phosphite products formed from the foregoing usually require some degree of purification such as achieved by recrystallization.

The process of treating white phosphorus with a source of hydroxyl ion, such as calcium or sodium hydroxide, is a commercial method for manufacturing hypophosphite. Depending upon reaction conditions used by-products appear such as phosphite and phosphine. However, the by-product phosphite produced by this method has been in minor amounts as compared to the hypophosphite and, of course, must be separated from the hypophosphite before it can be utilized in its normal degree of purity.

As can be appreciated from the foregoing, a process for preparing dialkali metal phosphites in a relatively easy, simple and straightforward manner as well as in relatively high yields and acceptable purity by utilizing white phosphorus as one of the reactants would represent an advancement in this art.

It is, therefore, an object of the present invention to provide an improved process for preparing alkali metal phosphites.

It is another object of the present invention to provide a process for preparing dialkali metal phosphites in a relatively easy, simple and straightforward manner.

It is a further object of the present invention to provide a process for preparing dialkali metal phosphites in relatively high yields and acceptable purity by utilizing white phosphorus as one of the reactants.

These and other objects will become apparent from the following detailed description.

It has now been found that dialkali metal phosphites can be prepared by reacting white phosphorus and an alkali metal hydroxide in an aqueous medium under reaction conditions such that the alkali metal hydroxide is used in amounts in excess of stoichiometry and at concentrations greater than 15% by weight, and the reaction is conducted at temperatures greater than about 50° C., as will be more fully discussed hereinafter. By following the teachings of the present invention, dialkali metal phosphites can be prepared in yields as high as about 70 to 74% and even higher, as well as in an acceptable purity, that is, with less than 10% by weight of hypophosphite impurities present. The foregoing is believed to be totally unexpected in view of the high yields of phosphite obtained and the minor amounts of byproducts formed, particularly hypophosphite and phosphate, in the process of the present invention.

In general, the following is the reaction for complete conversion of the elemental white phosphorus to the phosphite:

(I)  $P_4 + 8OH^- + 4H_2O \rightarrow 4HPO_3^{-2} + 6H_2$ and thus, for stoichiometry the $OH^-/P$ molar ratio is 2. Complete conversion, however, is rarely, if ever, achieved and volatile products such as $PH_3$, $P_2H_5$ and the like are usually produced to some degree in the reaction.

In general, any dialkali metal phosphite can be prepared by use of the corresponding alkali metal hydroxide, such as lithium hydroxide, sodium hydroxide, potassium hydroxide, rubidium hydroxide, cesium hydroxide and the like with sodium hydroxide and potassium hydroxide being preferred due to their availability and inexpensiveness and sodium hydroxide being particularly preferred.

For the reaction of the present invention, amounts of alkali metal hydroxide in excess of stoichiometry, that is, an $OH^-/P$ molar ratio greater than 2, is necessary and preferably the $OH^-/P$ molar ratio should be from about 2.5 to about 8, although molar ratios in excess of 8 can be used, such as molar ratios of 10 and even higher. Additionally, the reaction should be conducted in an aqueous medium, and particularly a strongly alkaline aqueous medium with the alkali metal hydroxide concentration greater than 15% by weight in order to minimize the formation of hypophosphite. Although hydroxide concentrations in excess of 50% can be used, such as 60% and even higher, the preferred range of concentration for the alkali metal hydroxide is from about 25% to about 50% by weight. Usually, any temperature in excess of the melting point of white phosphorus is suitable, that is, about 50° C., temperatures as high as 150° C. and even higher temperatures can be used, although the preferred temperature range is from about 65° C. to about 100° C.

In general, the reaction can be carried out by bringing together the white phosphorus and an aqueous solution or slurry of the alkali metal hydroxide, and heating the reactants under agitation until the desired phosphite product is formed. The dialkali metal phosphite can be used in a solution form, if desired, or can be recovered from the reaction medium by various methods, such as, removing the water by evaporation including vacuum evaporation, allowing the phosphite to crystallize by cooling a relatively hot saturated aqueous phosphite solution, allowing the phosphite to crystallize from a saturated solution by seeding the solution, precipitating by the addition of a miscible solvent in which the phosphite salts are less soluble, such as, methanol, ethanol, etc., and the like.

A particularly preferred method of recovering the dialkali metal phosphites from the reaction medium is by using the alkali metal hydroxide in concentrations greater than about 40% by weight and preferably from about 40% to about 50%, and at such concentrations the solubility of the dialkali metal phosphite is exceeded and the dialkali metal phosphite will crystallize as the reaction proceeds and can be recovered therefrom by filtration means and the like. This is a distinct advantage in that the dialkali metal phosphites can be recovered from the reaction medium in a relatively easy manner as well as in a relatively pure form and, in addition, such can be used, for example, in a continuous process for preparing the dialkali metal phosphites by continuously recovering the crystals from the aqueous medium and recycling the medium back to the reaction zone for re-use.

The following example is presented to illustrate the invention, with parts and percentages by weight being used unless otherwise indicated.

EXAMPLE

Into a 500 ml., 4-necked flask equipped with a stirrer, $N_2$ inlet, thermometer, gas outlet and an exit train of a trap and a Fisher-Milligan gas scrubber filled with 6 N sulfuric acid, was charged about 100 grams of the sodium hydroxide solution as indicated. The flask was then evacuated with $N_2$, and the phosphorus was introduced. The flask was heated to the temperature as indicated and the reactants were agitated by operation of the stirrer at a fixed setting. The following table sets forth the results under various process conditions.

TABLE 1

| Conc. (Percent NaOH) | Molar Ratio (NaOH/P) | Temperature (° C.) | Time (hr.) | Products [1] (Percent) $HPO_3^{-2}$ | $H_2PO_2^{-1}$ | Volatile Products $PH_3$, $P_2H_4$, etc. |
|---|---|---|---|---|---|---|
| 15 | 4 | 100 | 8 | 71.1 | 7.7 | 21.2 |
| 30 | 4 | 100 | 1 | 74.0 | 0.4 | 25.6 |
| 50 | 4 | 100 | 1 | 72.8 | 0.3 | 27.9 |
| 50 | 2.5 | 80 | 2 | 50.9 | 0.4 | 48.7 |
| 50 | 4 | 80 | 2 | 71.4 | 0.2 | 28.4 |
| 50 | 8 | 80 | .75 | 72.5 | 0.5 | 27.0 |
| 30 | 4 | 65 | 11.25 | 69.9 | 2.9 | 27.1 |
| 30 | 4 | 80 | 3 | 71.7 | 4.1 | 24.2 |
| 30 | 4 | 100 | 1 | 74.0 | 0.4 | 25.6 |

[1] Hypophosphite and phosphite were determined iodometrically by the method of Jones and Swift, Anal. Chem. 25, 1272 (1953).

As can be observed from the above table, by following the teachings of the present invention disodium phosphite can be prepared from elemental white phosphorus in relatively high yields and with a minimum of hypophosphite impurities.

Good results comparable to the foregoing example can also be obtained in preparing other dialkali metal phosphites, such as, dipotassium phosphite, dilithium phosphite, dirubidium phosphite, and the like and particularly dipotassium phosphite under substantially similar reaction conditions although, of course, the appropriate hydroxide must be used, that is, potassium hydroxide, lithium hydroxide, rubidium hydroxide and the like.

What is claimed is:

1. A process for preparing dialkali metal phosphites in yields of about 50 to 75 percent which comprises reacting white phosphorus and an alkali metal hydroxide in an aqueous medium at temperatures above about 50° C. with said hydroxide being present in amounts in excess of stoichiometry and at concentrations greater than 5% by weight.

2. The process of claim 1, wherein said temperature is from about 65 to 100° C.

3. The process of claim 2, wherein said hydroxide concentration is from about 25% to about 50% by weight.

4. The process of claim 3, wherein said hydroxide and said phosphorus are present in molar ratios of from about 2.5 to about 8, respectively.

5. The process of claim 4, wherein said alkali metal hydroxide is selected from the class consisting of sodium hydroxide and potassium hydroxide.

6. The process of claim 5, wherein said hydroxide is sodium hydroxide.

7. The process of claim 5, wherein said hydroxide is potassium hydroxide.

8. A process for preparing dialkali metal phosphite in yields of about 50 to 75 percent which comprises reacting white phosphorus and sodium hydroxide in an aqueous medium at temperatures from about 65 to about 100° C. with said hydroxide and said phosphorus present in molar ratios from about 2.5 to 8, respectively, and said hydroxide present at concentrations greater than about 40% by weight, and recovering crystals of said dialkali metal phosphite from the reaction medium.

9. The process of claim 8, wherein said alkali metal hydroxide is selected from the class consisting of sodium hydroxide and potassium hydroxide.

10. The process of claim 9, wherein said alkali metal hydroxide is sodium hydroxide.

11. The process of claim 10, wherein said hydroxide is present at concentrations of from about 40 to 50% by weight.

12. The process of claim 9, wherein said alkali metal hydroxide is potassium hydroxide.

13. The process of claim 12, wherein said hydroxide is present at concentrations of from about 40 to 50% by weight.

References Cited
UNITED STATES PATENTS 2,977,192   3/1961   Cummins _____ 23—107

OSCAR R. VERTIZ, *Primary Examiner.*

H. S. MILLER, *Assistant Examiner.*